May 3, 1960 S. E. BRADSHAW ET AL 2,935,478
PRODUCTION OF SEMI-CONDUCTOR BODIES
Filed Aug. 30, 1956
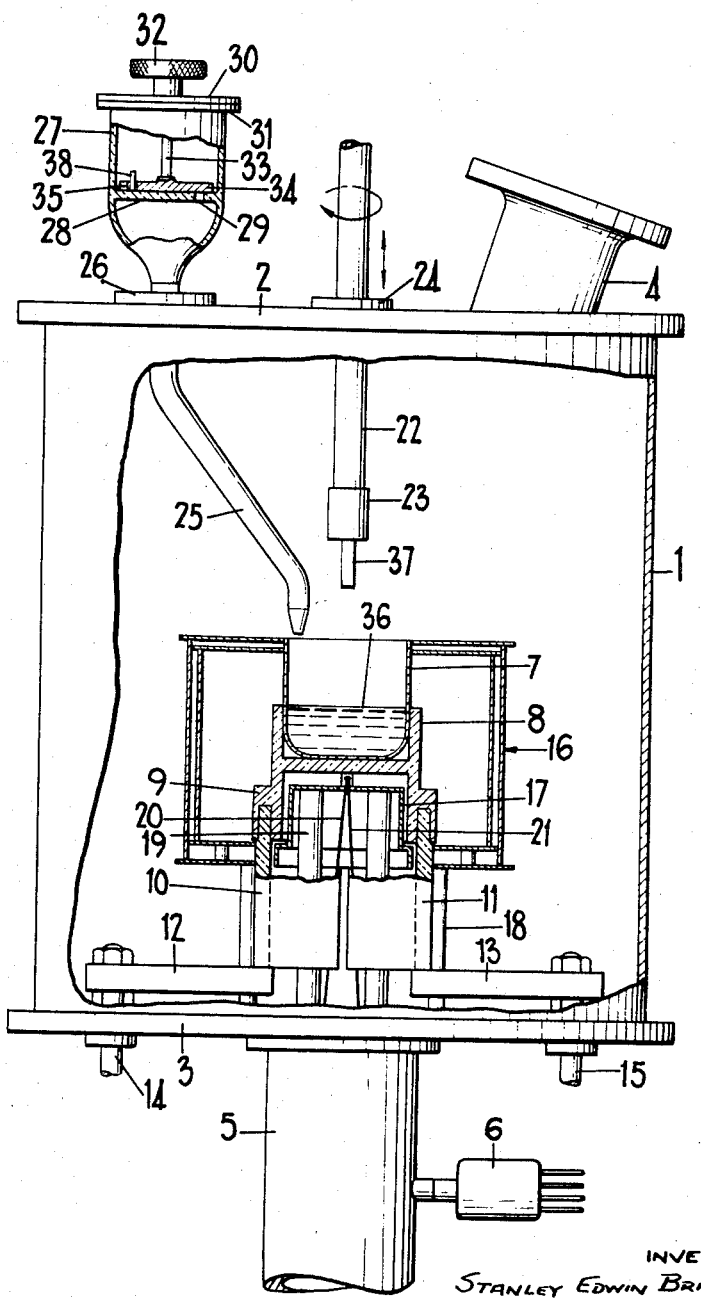
INVENTORS
STANLEY EDWIN BRADSHAW
ABRAHAM ISAAC MLAVSKY
BY
ATTORNEYS United States Patent Office 2,935,478
Patented May 3, 1960

2,935,478

PRODUCTION OF SEMI-CONDUCTOR BODIES

Stanley Edwin Bradshaw, Harrow, and Abraham Isaac Mlavsky, London, England, assignors to The General Electric Company Limited, London, England Application August 30, 1956, Serial No. 607,094

Claims priority, application Great Britain September 6, 1955

1 Claim. (Cl. 252—62.3)

This invention relates to the production of semiconductor bodies.

Methods of producing semiconductor bodies often involve the progressive solidification of a molten mass of a semiconductor, and in such a case it is common practice to control the properties of the resultant body by incorporating in the molten material at least one significant type-determining impurity (that is to say an impurity whose presence in the solid semiconductor affects at least one electrical characteristic of the semiconductor). Where this is done, it may be desirable that at least part of the semiconductor body should be as uniform as possible in respect of at least one electrical characteristic of the semiconductor, for example its resistivity; for some semiconductors, however, many of the available significant impurities display appreciable differential solubility in the liquid and solid phases of the semiconductor, so that as the molten material is progressively solidified the concentration if the significant impurity or impurities varies in the solidified material, thereby producing a corresponding variation in the electrical characteristics of the solidified material.

It is an object of the present invention to provide a method of producing a semiconductor body in which this effect is reduced.

According to the invention, in a method of producing a semiconductor body a molten mass of a semiconductor, containing at least one significant impurity which displays appreciable differential solubility in the liquid and solid phases of the semiconductor and further containing at least one significant impurity which is capable of evaporating at an appreciable rate from the molten semiconductor under suitable conditions, is progressively solidified under conditions such that during the solidification of at least part of the molten material appreciable evaporation of at least one significant impurity takes place from the molten material, the overall effects of the evaporation and the differential solubility on an electric characteristic of the solidified material being in opposition, and the rate of solidification being controlled so that the two effects balance each other to an extent such that the material solidified while evaporation is taking place is appreciably less variant in respect of the electrical characteristic than it would have been if no evaporation had taken place.

According to one aspect of the invention, in a method of producing a semiconductor body a molten mass of a semiconductor, containing a significant impurity which is appreciably more soluble in the liquid phase of the semiconductor than in the solid phase and which is capable of evaporating at an appreciable rate from the molten semiconductor under suitable conditions, is progressively solidified under conditions such that during the solidification of at least part of the molten material appreciable evaporation of the impurity takes place from the molten material, the rate of solidification being controlled so that while evaporation of the impurity is taking place the concentration of the impurity in the molten material is appreciably less variant than it would have been if no evaporation had taken place.

One method in accordance with the invention will now be described by way of example, with reference to the accompanying drawing, which is a side elevation, partly cut away to show internal details which are partly shown in section, of an apparatus for preparing single crystals of silicon.

Referring to the drawing, the apparatus includes a hermetically sealed enclosure constituted by a tubular metal member 1 to the ends of which are sealed top and base metal plates 2 and 3 respectively, the top plate 2 having sealed to it an inspection port 4 across the outer end of which is sealed a quartz window (not visible in the drawing) through which operations carried out in the enclosure can be observed. The enclosure is connected to a pumping system (not shown) by a pumping tube 5 to which is connected an ionization gauge.

Inside the enclosure is disposed a circular cylindrical crucible 7 of pure fused silica, the crucible 7 being seated within a circular cylindrical graphite cup 8 which is adapted to serve as an electric resistance heater. The cup 8 is formed integral with a downwardly extending circular cylindrical graphite skirt 9 which is split longitudinally so as to form two semi-cylindrical portions each of which has formed in it a slot into which fits one end of one of a pair of semi-cylindrical graphite members 10 and 11 which serve as supports and part of the lead system for the heater 8; the members 10 and 11 are themselves mounted on metal bars 12 and 13, which are in turn secured to metal bolts 14 and 15 which are sealed through the base plate 3 so as to be electrically insulated therefrom. The crucible 7 and heater 8 are surrounded by a heat reflecting metal baffle system 16, and a further heat reflecting baffle 17 is disposed inside the skirt 9; the baffle system 16 and baffle 17 are supported by means of quartz rods such as 18 and 19 which are themselves mounted on a metal spider (not visible in the drawing) which extends across the opening of the pumping tube 5. In operation of the apparatus, the temperature of the heater 8 is measured by means of a noble metal thermocouple including elements 20 and 21, the hot junction of the thermocouple being disposed close to the base of the heater 8 and the cold junction of the thermocouple (not shown) being maintained in melting ice. Besides being utilized to operate an indicating instrument (not shown) the voltage generated by the thermocouple is fed to a control unit (not shown) which is adapted to maintain the temperature of the heater 8 substantially constant at any desired setting by automatic control of the power supply to the heater 8.

The apparatus also includes a holder for a silicon seed crystal which is in the form of a vertically extending rod 22 to the lower end of which is secured a chuck 23, the rod 22 passing through a gland 24 in the top plate 2 and being both vertically movable and rotatable about its longitudinal axis by means of a suitable mechanism (not shown). The apparatus further includes a bent quartz tube 25 which passes through a gland 26 in the top plate 22, the tube 25 being rotatable in the gland 26 so that its lower end may be brought into or out of register with the crucible 7. The upper end of the tube 25 is sealed to a quartz dome 27 which has formed across it a partition 28 in which is formed an aperture 29; the upper end of the dome 27 is closed by a ground quartz plate 30 which mates with a ground quartz flange 31 formed on the end of the dome 27, the mating surfaces of the plate 30 and flange 31 being greased to maintain an effective seal between them. The plate 30 is provided with a knob 32 by means of which it can be rotated on the flange 31, and is connected by a rod 33 to a plate 34 which rests on the partition 28 and has formed in it an aperture 35.

In carrying out the method in accordance with the invention, a quantity of about 100 grams of solid silicon is placed in the crucible 7, the enclosure is evacuated by operating the pumping system so as to establish in the enclosure a vacuum corresponding to a pressure of the order of $10^{-5}$ to $10^{-6}$ millimetres of mercury as measured by the gauge 6, and the crucible 7 and its contents are then heated to a temperature 30° C. above the melting point of silicon by energising the heater 8 so as to form a pool 36 of molten silicon. The molten silicon 36 is maintained at this elevated temperature for about one hour, during which time it is purified by virtue of the evaporation of a large part of the impurities originally present, the enclosure being continuously pumped.

At the end of this time a silicon seed crystal 37 mounted in the chuck 23 and having a horizontal cross-sectional area of 25 square millimetres is dipped into the molten silicon 36 by moving the rod 22 downwards, and the temperature of the molten silicon 36 is lowered to the point at which it begins to solidify on to the seed crystal 37. The rod 22 is then moved slowly vertically upwards for a short time so that a small amount of silicon from the melt 36 progressively solidifies on to the seed crystal 37, and the seed crystal 37 is then withdrawn completely from the molten silicon 36 by moving the rod 22 upwards more rapidly. The tube 25 is then rotated so as to bring its lower end into register with the crucible 7, and a pellet 38, which has previously been disposed in the aperture 35 in the plate 34, is then caused to drop through the tube 25 into the molten silicon 36 by rotating the plates 30 and 34 by means of the knob 32 so that the aperture 35 in the plate 34 comes into register with the aperture 29 in the partition 28; the pellet 38 consists of a small quantity of silicon containing phosphorus (which acts as a donor impurity in silicon), the size and composition of the pellet 38 being chosen so as to establish a desired concentration of phosphorus in the molten silicon 36, and the temperature of the molten silicon 36 is slightly increased while the pellet 38 is dropped into it so as to ensure that the pellet 38 is rapidly melted.

The rod 22 is then moved downwards again so as to bring the silicon which initially solidified on to the seed crystal 37 into contact with the molten silicon 36, the temperature of the melt 36 is lowered to the point at which it begins to solidify again, and the rod 22 is then moved slowly vertically upwards at a rate such that silicon from the melt 36 progressively solidifies to form a single crystal propagated from the seed crystal 37, this single crystal being in the form of a vertically extending rod. In order to ensure homogeneous mixing, the rod 22 is rotated about a vertical axis at a speed of three revolutions per minute while it is being moved upwards. The process is terminated when substantially all the molten silicon 36 has been withdrawn from the crucible 7.

The silicon solidifying after the addition of the pellet 38 to the molten silicon 36 is of N-type conductivity due to the presence of the phosphorus, and the initial concentration of the phosphorus in the molten silicon 36 is of course chosen so that the solidified material has a desired resistivity. In the absence of any counter measures, the concentration of phosphorus in the molten silicon 36 would continuously increase during the growth of the single crystal with a consequent decrease of the resistivity along the length of the single crystal, due to the fact that phosphorus is appreciably more soluble in liquid silicon than in solid silicon. During the growing of the single crystal, however, the enclosure is pumped continuously, so that appreciable evaporation of phosphorus takes place continuously from the molten silicon 36. The rate of growth of the single crystal is chosen so that the effect of this evaporation substantially balances the effect of the differential solubility of phosphorus, so that the concentration of phosphorus in the molten silicon 36 remains substantially constant, thereby resulting in the part of the single crystal solidified after the addition of the pellet 38 being of substantially uniform resistivity.

The results obtainable by use of the invention may be illustrated by quoting the case of one single crystal grown as described above. This single crystal had a cross-sectional area of five square centimetres, and was grown at a uniform rate of one millimetre per minute, the whole growth taking a time of about 90 minutes; the pellet 38 consisted of 0.09 gram of silicon containing phosphorus at a concentration such that its resistivity was about 0.01 ohm centimetre N-type. The resistivity of the single crystal was substantially uniform at approximately five ohm centimetres over the whole of the part which was solidified after the addition of the pellet 38, the part solidified before the addition of the pellet 38 being P-type material having a resistivity of approximately 100 ohm centimetres. This result may be compared with a case in which a single crystal was grown under similar conditions, except that a filling of inert gas at atmospheric pressure was maintained in the enclosure continuously after the addition of the phosphorus, so that evaporation of phosphorus from the molten silicon was practically eliminated. In this case the resistivity of the N-type part of the single crystal varied from about five ohm centimetres at the end which was first to solidify to about one ohm centimetre near the end which was last to solidify.

In the arrangement described above, the effect of differential solubility of a significant impurity is counterbalanced by the effect of evaporation of the same impurity. Various alternative possibilities within the scope of the invention are envisaged, in which a balance is achieved between the respective overall effects of differential solubility and evaporation of two or more significant impurities; in such cases, for one or more of the impurities involved the individual effect of either differential solubility or evaporation might be negligible, or might be to some extent in opposition to the corresponding individual effect for another or others of the impurities involved. One specific possibility which is contemplated is counteracting the effect of a donor or acceptor impurity being more soluble in the solid phase of the semiconductor than in the liquid phase by utilising the effect of evaporation of a second impurity which is of the opposite type to the first.

We claim:

A method of producing a semiconductor body, said method comprising the steps of providing silicon and at least one type-determining impurity which displays appreciable differential solubility in the liquid and solid phases of silicon, melting said silicon and said impurity to form a molten mass, maintaining a sub-atmospheric pressure over the molten mass of silicon and impurity so that evaporation of said impurity takes place from said molten mass, and progressively solidifying the silicon and impurity from the molten mass on a crystal and concurrently pulling the crystal with the solidified silicon and impurity from said molten mass at such a rate that the increase of impurity in the motlen silicon due to the differential solubility of the impurity in the liquid and solid phases of the silicon is appreciably offset by the evaporation of the impurity from the molten mass.

References Cited in the file of this patent

UNITED STATES PATENTS

| | | |
|---|---|---|
| 2,727,840 | Teal | Dec. 20, 1955 |
| 2,768,914 | Buehler | Oct. 30, 1956 |
| 2,783,168 | Schweickert | Feb. 26, 1957 |
| 2,802,759 | Moles | Aug. 13, 1957 |
| 2,809,135 | Koury | Oct. 8, 1957 |
| 2,815,304 | Gudmundsen | Dec. 3, 1957 |
| 2,822,308 | Hall | Feb. 4, 1958 |